United States Patent
Aga et al.

(10) Patent No.: US 10,782,918 B2
(45) Date of Patent: Sep. 22, 2020

(54) NEAR-MEMORY DATA-DEPENDENT GATHER AND PACKING

(71) Applicant: Advanced Micro Devices, Inc., Santa Clara, CA (US)

(72) Inventors: Shaizeen Aga, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 33 days.

(21) Appl. No.: 16/123,837

(22) Filed: Sep. 6, 2018

(65) Prior Publication Data

US 2020/0081651 A1 Mar. 12, 2020

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/0673* (2013.01); *G06F 11/1076* (2013.01)

(58) Field of Classification Search
CPC .... G06F 3/0659; G06F 3/0604; G06F 3/0673; G06F 11/1076
See application file for complete search history.

(56) References Cited

U.S. PATENT DOCUMENTS

| | | | | |
|---|---|---|---|---|
| 9,348,539 | B1 * | 5/2016 | Saxena | G11C 5/04 |
| 10,353,601 | B2 * | 7/2019 | Beard | G06F 3/0619 |
| 2014/0136811 | A1 * | 5/2014 | Fleischer | G06F 13/28 |
| | | | | 711/207 |
| 2014/0149713 | A1 * | 5/2014 | Jha | G06F 9/30036 |
| | | | | 712/4 |
| 2015/0169357 | A1 * | 6/2015 | Busaba | G06F 9/467 |
| | | | | 711/150 |
| 2017/0048320 | A1 * | 2/2017 | Farmahini-Farahani | |
| | | | | H04L 67/1097 |
| 2017/0090921 | A1 * | 3/2017 | Hughes | G06F 9/30007 |
| 2017/0270053 | A1 * | 9/2017 | Brown | G06F 9/30036 |
| 2017/0371657 | A1 * | 12/2017 | Mahurin | G06F 9/3005 |
| 2018/0088942 | A1 * | 3/2018 | Abraham | G06F 9/3001 |
| 2018/0157437 | A1 * | 6/2018 | Sandberg | G06F 3/0647 |

(Continued)

OTHER PUBLICATIONS

Han, S. et al., "Learning Both Weights and Connections for Efficient Neural Networks", Proceedings of the 28th International Conference on Neural Information Processing Systems, vol. 1, pp. 1135-1143, Dec. 7-12, 2015, Montreal, CA.

(Continued)

*Primary Examiner* — Ryan Bertram
(74) *Attorney, Agent, or Firm* — Volpe and Koenig, P.C.

(57) ABSTRACT

Methods, systems, and devices for near-memory data-dependent gathering and packing of data stored in a memory. A processing device extracts a function, a memory source address, and a memory destination address from a near-memory data-dependent gathering and packing primitive. A signal to perform gathering and packing operations based on the primitive is sent to near-memory processing circuitry of a memory device. The near-memory processing circuitry receives the signal, gathers data from the memory device based on the function and the memory source address, and packs the gathered data into the memory device based on the memory destination address.

42 Claims, 6 Drawing Sheets

(56) References Cited

U.S. PATENT DOCUMENTS

2018/0246722 A1* 8/2018 Plotnikov ........... G06F 9/30032
2019/0347125 A1* 11/2019 Sankaran ............. G06F 9/3004

OTHER PUBLICATIONS

Zhang, S. et al., "Cambricon-X: An Accelerator for Sparse Neural Networks", Proceedings of the 49th Annual IEEE/ACM International Symposium on Microarchitecture, Article No. 20, 12 pgs., Oct. 15-19, 2016, Taipei, TW.

* cited by examiner

US 10,782,918 B2

NEAR-MEMORY DATA-DEPENDENT GATHER AND PACKING

BACKGROUND

Typical microprocessors, such as central processing units (CPUs) or graphics processing units (GPUs), execute instructions specifying an operation and one or more locations in memory to which the operation can apply. Some such instructions can specify a range of memory locations to which the operation will apply. However, in some cases, it is desired to perform the operation on data within the range of memory locations only if that data exhibits certain characteristics (e.g., is non-zero, is positive, is above a certain threshold, is below a certain threshold, is positive, and so forth). Such operations can be referred to as data dependent and can be said to exhibit compute sparsity.

Conceptually, compute sparsity might be expected to result in performance gains, such as increased computation speed or energy savings due to not performing operations unnecessarily within a range. However, performance often decreases in practice. In some cases, this performance decrease occurs where a processor, such as a CPU or GPU, needs to inspect each entry to determine whether it meets the criteria whether it performs the operation or not, resulting in poor total memory access times.

BRIEF DESCRIPTION OF THE DRAWINGS

A more detailed understanding can be had from the following description, given by way of example in conjunction with the accompanying drawings wherein.

DETAILED DESCRIPTION

Figure 1:
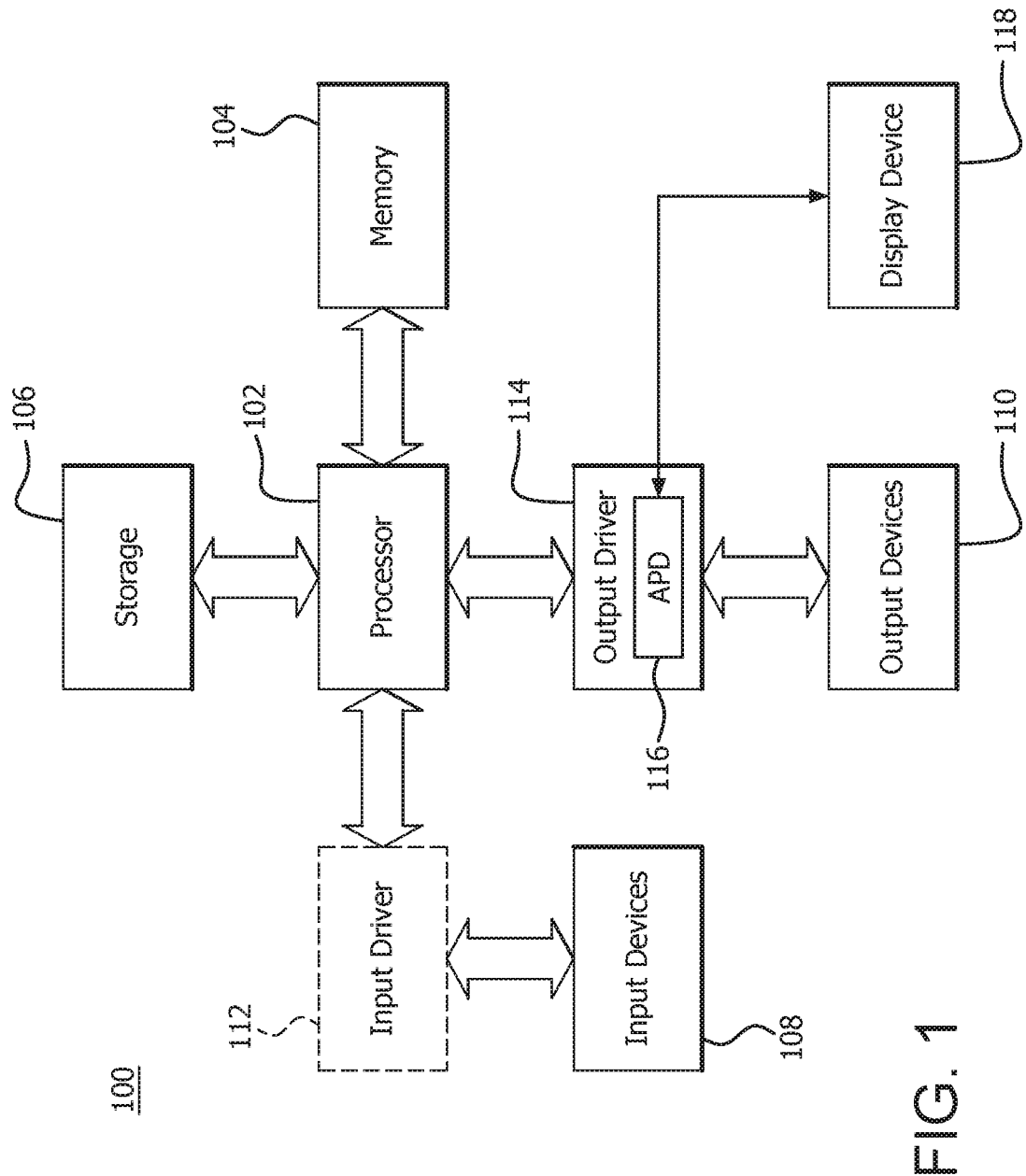
FIG. 1 is a block diagram of an example device in which one or more features of the disclosure can be implemented.

Some implementations provide a method for near-memory data-dependent gathering and packing of data stored in a memory. The method includes extracting, by a processing device, a function, a memory source address, and a memory destination address, from a near-memory data-dependent gathering and packing primitive; sending a signal to perform gathering and packing operations based on the primitive to near-memory processing circuitry of a memory device; receiving, by the near-memory processing circuitry, the signal; gathering, by the near-memory processing circuitry, data from the memory device based on the function and the memory source address; and packing, by the near-memory processing circuitry, the gathered data into the memory device based on the memory destination address.

Some implementations provide a computing device for near-memory data-dependent gathering and packing of data. The computing device includes a processing device which includes processing circuitry; and a memory device which includes near-memory processing circuitry. The processing circuitry extracts a function, a memory source address, and a memory destination address, from a near-memory data-dependent gathering and packing primitive. The processing circuitry sends a signal to perform gathering and packing operations based on the primitive to near-memory processing circuitry of the memory device; The near-memory processing circuitry receives the signal; The near-memory processing circuitry gathers data from the memory device based on the function and the memory source address. The near-memory processing circuitry packs the gathered data into the memory device based on the memory destination address.

Some implementations provide a processing device for near-memory data-dependent gathering and packing of data. The processing device extracts a function, a memory source address, and a memory destination address from a near-memory data-dependent gathering and packing primitive. The processing device also sends a signal to perform gathering and packing operations based on the primitive to near-memory processing circuitry of a memory device. The gathering and packing operations include the near-memory processing circuitry gathering data from the memory device based on the function and the memory source address; and packing the gathered data into the memory device based on the memory destination address.

Some implementations provide a configurable gather-packer device on a memory device and configured for near-memory data-dependent gathering and packing of data stored in the memory device. The configurable gather-packer device receives, from a processing device, a signal to perform gathering and packing operations based on a function, a memory source address, and a memory destination address. The configurable gather-packer device gathers data from the memory device based on the function and the memory source address; and packs the gathered data into the memory device based on the memory destination address.

Some implementations provide a method for data-dependent gathering and packing of data stored in a memory device. The method includes extracting, by a core of a processing device, a function, a memory source address, and a memory destination address, from a near-memory data-dependent gathering and packing primitive; sending a signal to perform gathering and packing operations based on the primitive to a configurable gather-packer device of the processing device; receiving, by the configurable gather-packer device, the signal; gathering, by the configurable gather-packer device, data from the memory device based on the function and the memory source address; and packing, by the configurable gather-packer device, the gathered data, into the memory device based on the memory destination address. Operations carried out by the configurable gather-packer device are not cached on the processing device.

Some implementations provide a computing device for near-memory data-dependent gathering and packing of data. The computing device includes a processing device which includes processing circuitry and a configurable gather-packer device; and a memory. The processing circuitry extracts a function, a memory source address, and a memory destination address, from a near-memory data-dependent gathering and packing primitive. The processing circuitry sends a signal to perform gathering and packing operations based on the primitive to the configurable gather-packer device. The configurable gather-packer device receives the signal to gather data from the memory device based on the function and the memory source address; and to packs the gathered data into the memory device based on the memory destination address. Operations carried out by the configurable gather-packer device are not cached on the processing device.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD 116 accepts compute commands and graphics rendering commands from processor 102, processes those compute and graphics rendering commands, and provides pixel output to display device 118 for display. As described in further detail below, the APD 116 includes one or more parallel processing units that perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
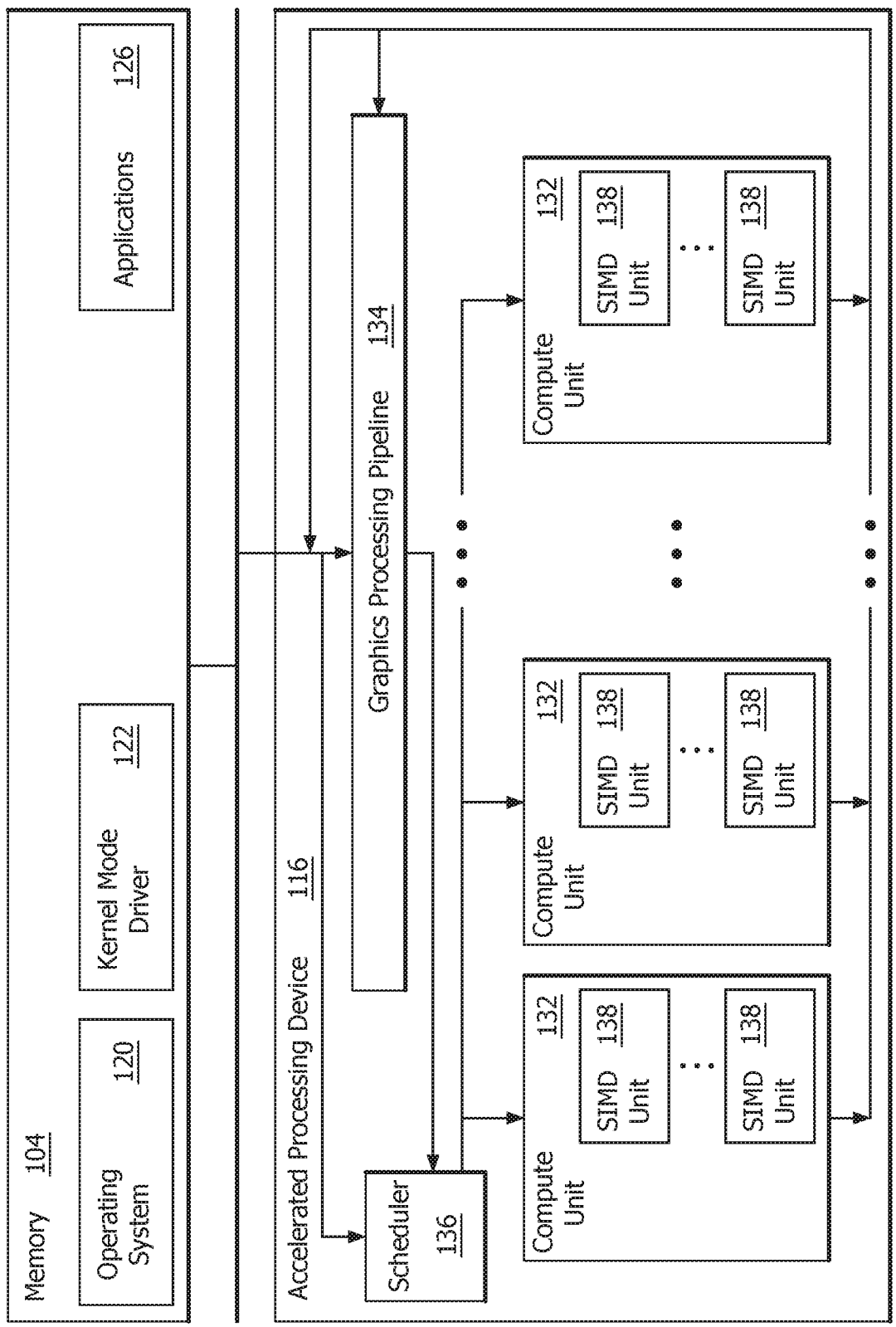
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Processor 102 may include a memory management unit (MMU) and translation lookaside buffer (TLB) to translate between virtual memory addresses and physical memory addresses (e.g., in memory 104).

The terms processing in memory (PIM), processing near-memory (PNM), or processing in or near-memory (PINM), all refer a device which includes a non-transitory computer readable memory device, such as dynamic random access memory (DRAM), and one or more processing elements. The memory and processing elements may be located on the same chip, within the same package, or may otherwise be tightly coupled. For example, a PNM device could include a stacked memory having several memory layers stacked on a base die, where the base die includes a processing device that provides near-memory processing cap abilities.

Various examples described herein use PIM to implement mechanisms and primitives for near-memory data dependent gather and packing. In some implementations, such mechanisms and primitives better enable processing units (CPU, GPU, etc.) to harness compute sparsity. Compute sparsity is manifested when computation is to be performed only if data exhibits certain characteristics (non-zero, positive, above or below certain threshold, etc.). While in theory such compute sparsity might be expected to bring significant performance and energy savings, such savings are hard to realize in practice. A key reason for this is that exploiting compute sparsity often leads to poor memory access characteristics. Various examples discussed herein address this challenge. Some such examples use near-memory gather and packing primitives, wherein the gather is configurable to select only data that exhibits certain characteristics. The selected data is then packed and stored so that processing units can access it efficiently. In some implementations, executing such primitives in near-memory positions facilitates exploitation of higher memory bandwidth (if available). Further, executing such primitives in near-memory processing also prevents pollution of one or more levels of caches in some implementations. Still further, executing such primitives in near-memory processing also allows for such gathering and packing to occur concurrently or simultaneously with other computations happening on the processing units, improving performance in some implementations.

Compute sparsity manifests in several important domains, such as graphics, high performance computing (HPC), and so forth. In some cases, efficient exploitation of compute sparsity can be useful for machine learning. For example, pruning can be employed to induce sparsity (zero values) in a neural network to reduce the number of synapses considerably (e.g., by driving 90% of synapses to zero). Aside from this static sparsity, neural networks also exhibit dynamic sparsity for activations as a consequence of popular activation functions like Rectified Linear Units (ReLU). Present techniques are unable to exploit this sparsity efficiently and, as a result, sparse computations are slower than their dense counterparts in many cases. Various techniques discussed herein facilitate exploitation of such compute sparsity in machine learning and other domains to deliver considerable performance and energy savings in some cases.

Compute sparsity is present when computation only needs to be carried out on data that exhibits certain characteristics. Examples of such characteristics include computing on data which includes non-zero values, positive (or negative) values, values above/below certain threshold etc. Compute sparsity is beneficial in some cases where it can substantially lower the number of required computations, contributing to performance and energy savings.

Such compute sparsity, if harnessed to avoid computations, has the potential to speed up applications across key domains, such as machine learning. However, present processing units (CPU, GPU, etc.) are incapable of exploiting this compute sparsity. For example, kernels for computing on sparse data can yield worse performance than their dense counterparts, despite requiring much larger numbers of computations.

One reason for this counterintuitive result is that naïve kernels attempting to exploit compute sparsity exhibit inefficient memory access patterns. In some implementations exploiting compute sparsity necessitates accessing memory in a non-contiguous manner which is slower. For example, GPUs often employ coalescing when threads within a wavefront access adjacent memory blocks, which reduces the effective number of memory requests. Such coalescing is not possible when work-items access non-contiguous data items to exploit compute sparsity.

Naïve kernels designed to exploit compute sparsity might be expected to input data packed in specialized formats (e.g., compressed sparse row in case of non-zero sparsity, etc.). However, in some implementations, such packing would incur preprocessing overheads to convert data into the specialized formats, require inefficient memory access patterns, and pollute caches. Accordingly, various techniques, devices, and systems discussed herein contribute to improving the efficiency of such computations by avoiding pulling data inside caches and by performing gathering and packing near-memory.

Compute sparsity is particularly hard to exploit in some cases where it is dynamic, as the sparsity pattern cannot be pre-analyzed. This precludes generation of specialized formats expected by kernels exploiting compute sparsity. A possible cause for dynamic compute sparsity is where its manifestation depends on input values. An example of this is data sparsity (zero values) exhibited by intermediate results in neural networks (activations) which are often based on input data. Various techniques, devices, and systems discussed herein can address such dynamic sparsity by accelerating gathering and packing of sparse data for subsequent consumption.

The primitives proposed in the present teachings gather data based on desired characteristics and pack them in a manner so as to make accesses by processing units memory-friendly. By executing such primitives near-memory, in some implementations, cache pollution can be avoided, data gather/packing can be overlapped with other computations on processing units and compute sparsity can be exploited.

Techniques for implementing gather and scatter capabilities near-memory using addressing patterns, including indirect addresses that are specified by a sequence of offsets, can facilitate skipping over certain memory locations. In some implementations, such skips are specified in terms of memory addresses and are not data dependent. In other words, such techniques are oblivious to the data values being read from the memory locations that are part of the gather operation. Various techniques, devices, and systems discussed herein, on the other hand, facilitate gather operations which inspect the data being read from memory and skip over values that do not meet the specified criteria.

In some implementations, various elements to facilitate near-memory data dependent gathering and packing include primitives which direct a near-memory unit to gather data from a given set of memory locations based on a configurable function and store it to another given location in a packed form, and a near-memory unit which receives and executes such primitives, including filtering out data that does not meet the criteria specified by the configurable function.

Figure 3:
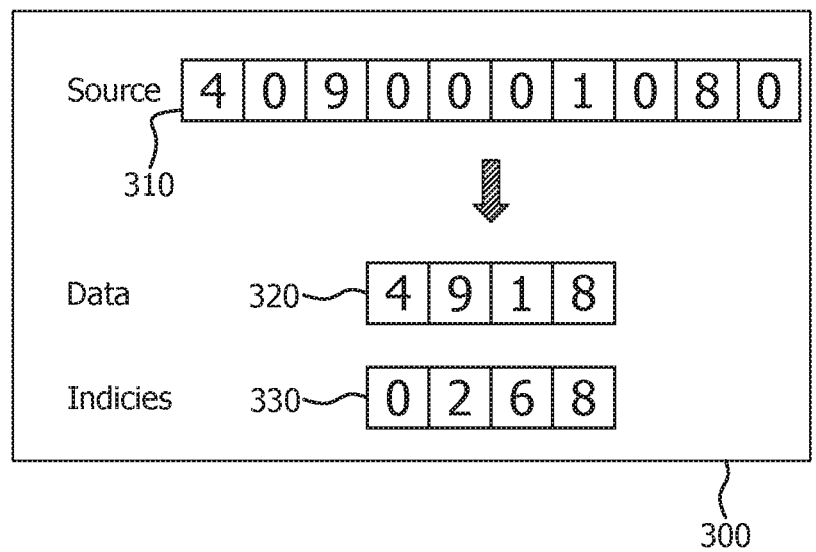
FIG. 3 is a block diagram of portions of a memory device which illustrate an example of a data-dependent gather and packing operation.

FIG. 3 is a block diagram of portions of a memory device 300 which illustrates a simple example of a data-dependent gather and packing operation. For the data gather and packing operation, a range of memory at source memory location 310 is examined to determine whether data stored in the range meets one or more criteria. In this example, the criterion is that the stored data value is non-zero. Accordingly, data values within the source memory location 310 meeting the criterion are gathered from source memory location 310 and packed together in a destination memory location 320. Indices referencing the locations of the data gathered and packed into destination memory location 320 are stored in an index memory location 330. In different implementations, the packed indices are stored contiguously or non-contiguously with the packed data. In some implementations, the indices specify the position of each gathered data item within source data locations. In some implementations, the user does not require the indices and retrieves only the gathered and packed data. In some implementations, the indices are not packed.

Figure 4:
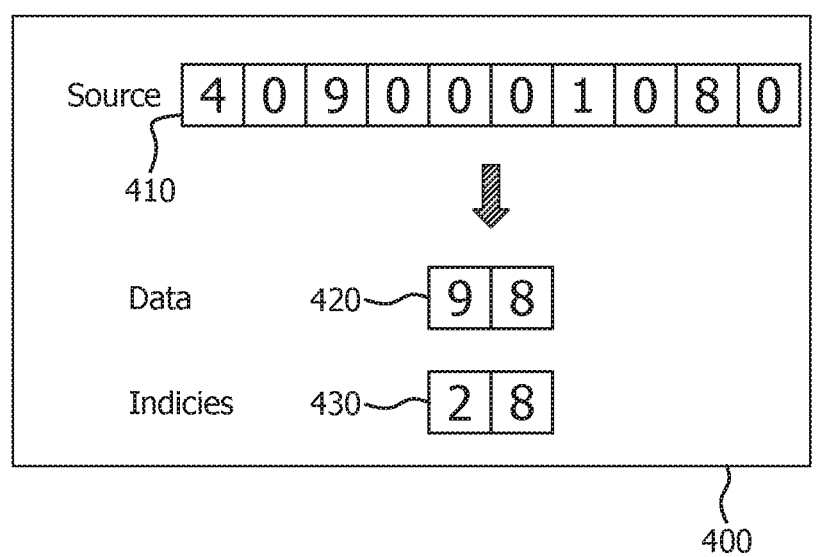
FIG. 4 is a block diagram of portions of a memory device which illustrate another example of a data-dependent gather and packing operation.

FIG. 4 is a block diagram of portions of a memory device 400 which illustrates a simple example of a data-dependent gather and packing operation. For the data gather and packing operation, a range of memory at source memory location 410 is examined to determine whether data stored in the range meets one or more criteria. In this example, the criterion is that the stored data value exceeds a threshold value of 4. Accordingly, data values within the source memory locations 410 meeting the criterion are gathered from source memory locations 410 and packed together in a destination memory location 420. Indices referencing the locations of the data gathered and packed into destination memory location 420 are stored in an index memory location 430. In different implementations, the packed indices are stored contiguously or non-contiguously with the packed data.

The functionality exemplified in FIGS. 3 and 4 includes carrying out computation in a sparse manner on a source array which stores data. This functionality can be expressed using a primitive, and various example primitives and mechanisms discussed herein store both values and their indices to a specified destination in memory. In some implementations, primitives, such as the example primitives discussed herein, can be used to communicate to the relevant hardware that near-memory data-dependent gather and packing is desired. In some implementations, such primitives include a source memory address, destination address and other parameters. Such primitives can be exposed to the programmer in myriad ways, including but not limited to an instruction, library function call, and so forth. In some implementations, the values and indices can be stored to different locations (i.e., non-contiguously), while in other implementations, the values and indices can be stored contiguously. Other variations on the storage pattern for values and/or indices are also possible.

FIGS. 3 and 4 illustrate two examples of desired functionality for data-dependent near-memory gathering and packing, and primitives proposed herein. The source array includes data on which computation is to be carried out in a sparse manner. In the example of FIG. 3, computation is desired only on non-zero elements. In the example of FIG. 4, computation is desired on values above a specified threshold value (4 in this case). In each case, the primitives and mechanism discussed herein can be used to store to the specified destination both the values and their indices.

The following example primitive, expressed in pseudo-code, illustrates one possible example for expressing the data-dependent gathering and packing operation functionality described above using FIGS. 3 and 4 as examples:
gather_and_pack_type_type function, threshold, source_address, dest_address, dest_idx_address, count The example gather_and_pack_type_type primitive includes several arguments, which are exemplary. Other suitable primitives for expressing data-dependent gathering and packing operation functionality may include different arguments, or a greater or lesser number of arguments. The naming scheme of the primitive, in this example, indicates the variable type of the data to be gathered and of the indices to be packed. For example, gather_and_pack_int_int could be used to indicate a near-memory gather and pack operation where the data to be gathered is in integer form, and that the indices are to be packed in integer format. It is noted that other suitable variable types are also possible, such as float, double, boolean, and so forth.

In this example, the function argument specifies a predefined function which determines which values to gather. The function can be defined in any suitable way, such as part of an instruction set architecture (ISA), as a library function call, and so forth. Examples of such functions include determination of whether the stored value is non-zero, positive, negative, above a given threshold or below a given threshold. The example operation described with respect to FIG. 3 is described, in terms of the example gather_and_pack_type_type primitive, as taking a non-zero function argument in some implementations. The example operation described with respect to FIG. 4 is described, in terms of the example gather_and_pack_type_type primitive, as taking an "above the given threshold" function argument in some implementations.

The threshold argument specifies a threshold for those functions, such as threshold value functions, that do not themselves include a specific threshold. In some implementations, the threshold argument is optional in the example gather_and_pack_type_type primitive, since some functions, such as non-zero, positive, and negative, do not require an input threshold. Some functions (e.g., the positive value function) can be conceptualized as a kind of threshold function (e.g., as identifying values above a threshold of zero) but do not require the threshold argument, as the threshold (e.g., zero) is implicit in the function itself.

FIG. 4 is described, in terms of the example gather_and_pack_type_type primitive, as taking a threshold argument having a value of 4 in some implementations. FIG. 3 is described, in terms of the example gather_and_pack_type_type primitive, as not taking a threshold argument in some implementations, since no threshold needs to be specified for a "non-zero" function argument. While the non-zero function could be conceptualized as having thresholds (i.e., as returning values above zero and below zero), such thresholds would nevertheless be implicit in the function and would not need to be specified using a threshold argument.

The example gather_and_pack_type_type primitive also takes source, destination and destination index addresses along with a count argument. The source argument specifies a memory location of data from which to read inputs to the function. In the example gather_and_pack_type_type primitive, source data is read from a number of consecutive or contiguous memory locations starting at the memory location specified by the source argument, where the number is specified by the count argument.

Many other suitable ways of specifying the source memory location are possible, such as where the source data is read from contiguous locations using ranges, or non-contiguous locations using strided, multi-dimensional, or indirect access patterns. For example, in some implementations the source argument indicates a memory address, a starting memory address, a range of memory addresses, a particular memory module or modules, and so forth. In some implementations, the source argument is modified by one or more other arguments. For example, in some implementations, if the source argument indicates a starting memory address, a different argument (not shown in the example gather_and_pack_type_type primitive) specifies an ending memory address of a range of addresses. Other possible implementations include an argument to specify a stride or other pattern of memory accesses (e.g., read every third address between the starting address and ending address) and so forth.

In some implementations, a range of source memory could be implied by the function argument, either based on a starting address specified in the source argument, or without needing a source argument. With respect to the examples of FIGS. 3 and 4, a source argument could be used to indicate the starting address of source memory locations 310 and 410 respectively, and the count argument could be used to indicate that ten memory locations are read, starting with the starting address.

In some implementations, the primitive also specifies the type of data to be read and/or the type of index values to be written (e.g., integer, float, boolean, and so forth as discussed above). In some examples, additional arguments are specified to limit the maximum size of the output to be written to the destination memory (e.g., if the space reserved for the output is less than the input value range). In some examples, the primitive specifies a return value indicating a number of gathered elements that were placed in the output location after the function completes. In some examples, an argument is used to indicate a memory address to which the return value should be written.

The example primitive and examples illustrated with respect to FIGS. 3 and 4 gather data from a contiguous range of memory for the source values. In other possible implementations, the source data is derived from non-contiguous locations using strided, multi-dimensional, or indirect access patterns. Techniques for specifying such access patterns require additional input arguments in some implementations.

Figure 5:
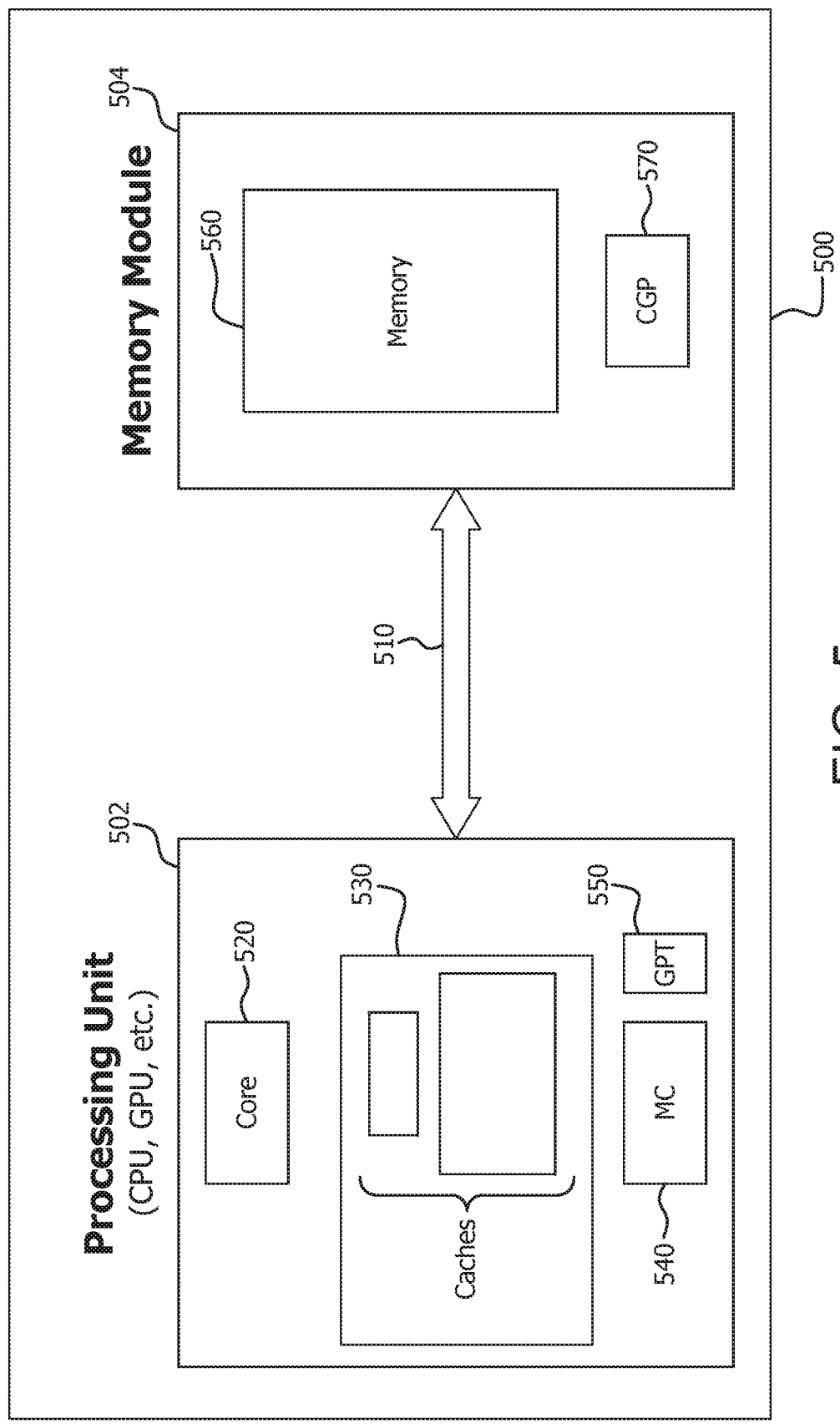
FIG. 5 is a system diagram illustrating an example system operable to perform near-memory data-dependent gather and pack operations.

FIG. 5 is a system diagram illustrating an example system 500 operable to perform near-memory data-dependent gather and pack operations such as those described with respect to FIGS. 3 and 4. System 500 includes a processing unit 502 which is in communication with a memory module 504 via an interconnect 510. System 500 is implemented using any suitable computer hardware, such as, for example, device 100 as shown and described with respect to FIGS. 1 and 2. In some such examples, processing unit 502 corresponds to processor 102 and memory module 504 corresponds to memory 104. Interconnect 510 includes any suitable computer communications medium, such as a Peripheral Component Interconnect Express (PCIe) bus or other bus.

Processing unit 502 includes a core 520, cache memory 530, memory controller (MC) 540, and gather and pack tracker (GPT) 550. Processing unit 502 can include any suitable processing device, such as a CPU, GPU, APU, or the like. Cache memory 520 can include any suitable cache memory, and can include more than one layer (e.g., L1, L2, etc.). MC 540 includes suitable memory controller circuitry, such as a memory management unit (MMU) or input-output memory management unit (IOMMU), for example.

Memory module 504 includes memory 560 and a configurable gather/packer (CGP) 570. CGP 570 carries out operations specified by gather and pack primitives, such as those discussed herein. In some implementations, CGP 570 receives signaling from MC 540 specifying the near-memory data-dependent gather and pack operation based on execution of the primitive by core 520. Memory 560 includes any suitable non-transitory computer memory device or devices, such as dynamic random access memory (DRAM), high bandwidth memory (HBM), hybrid memory cube (HMC), stacked memory, or any other suitable device or combination of these. In some implementations, memory 560 includes a number of memory layers stacked on top of a base die. In some implementations, CGP 570 is implemented on such base die. CGP 570 provides near-memory computation capabilities, including execution of gather and pack operations, such as described herein, for example, as described with respect to the example gather_and_pack_type_type primitive, or other such primitives.

Processing core 520 carries out near-memory data-dependent gather and pack operations on data stored in memory 560. In some implementations, processing core 520 executes a gather_and_pack_type_type primitive, or another suitable primitive, or other instruction, command, combination of these, or otherwise, for performing gather and pack operations as discussed herein (or one or more instructions, etc., based on such primitives). The examples herein are described with respect to a primitive for the sake of example, but are implemented using other instructions, commands, or the like in other implementations.

Processing core 520 executes the primitive, signaling to memory module 504 that it should gather data stored in an area of memory (e.g., as indicated by the source address argument) based on a function (e.g., as indicated by the function primitive) and that it should pack the gathered data to an area of memory (e.g., as indicated by the destination address argument). The primitive may also indicate that indices (e.g., memory addresses) indicating source addresses of the gathered and packed data should be packed to an area of memory (e.g., as indicated by the destination index address argument) or should be packed into an area of memory contiguous with the packed data, or otherwise as discussed herein.

In more detail, a gather and pack primitive (e.g., gather_and_pack_type_type) is executed by the processing core 520. In some implementations, the primitive is executed as part of a program executing on processing core 520. Processing core 520 signals to memory module 504 to perform a near-memory data-dependent gather from a specified source address based on a specified function and perform a pack to the specified destination address (as specified by the primitive). In some implementations, a memory subsystem of core 502 (e.g., MC 540 and/or related circuitry) flushes cache blocks within cache 530 belonging to source/destination addresses to which the primitive refers in order to preserve coherence of data. In such cases, flushing data from cache 530 in this manner causes it to be written to memory 560. This facilitates the reading of data from memory 560 by CGP 570 that is coherent (i.e., the latest written value to a given location). In some cases, CGP 570 would otherwise potentially read data from memory 560 that had been updated in cache 530 but not yet written back to memory 560. Flushing cache blocks belonging to the source address is beneficial in some cases as it is likely the core 520 will instead access the data at the destination address to which it is packed by CGP 570. In some implementations, cache blocks are not flushed prior to the gather. In some implementations, this is because coherence is relaxed for the data to be gathered. After memory subsystem 520 flushes the cache blocks, memory subsystem 520 signals the memory controller 540 (MC) to issue a near-memory data-dependent gather command to the CGP 570.

In some cases, the memory subsystem of core 502 (e.g., MC 540 and/or related circuitry) resolves accesses (e.g., reads or writes) to memory locations being gathered while the gather operation is "in flight," i.e., prior to completion of the gather operation. In some implementations, the memory subsystem performs this resolution in response to a request from processing module 502 or an element thereof. If the destination memory addresses are accessed before execution of the primitive is complete, incorrect data will be read by core 502 in some cases. In an example approach for handling cases where memory locations subject to in-flight gather operations are requested, MC 540 tracks the addresses of the requested resolutions, along with any range or other relevant arguments for specifying the addresses being operated on, in GPT 550 until execution of the primitive has completed (i.e., the function has completed gathering and packing). The addresses are stored in GPT 550 in order to block any reads/writes from the processing module 502 to these addresses. GPT 550 can be implemented as a part of MC 540, as circuitry on processing unit 502 that is separate from MC 540, or in another suitable way.

In some implementations, GPT 550 may store individual tracking state for each of the gathered output data locations by storing a flag (e.g., a bit) per location. Such fine-grain tracking may permit a consumer of the gathered and packed data, such as processing module 502, to begin consuming the output stream (i.e., the gathered data) even before the gather primitive has fully completed.

In some implementations, for example, to avoid hardware overhead associated with tracking in-flight gather operations, the primitive may return a handle to a completion event when the primitive is invoked. In response to having received the handle, processing unit 502 can wait (e.g., can stall execution of a program or thread) for the completion event to occur before accessing any of the memory locations being operated on by the gather primitive. In some implementations, the completion event is triggered by the MC 540 after the gather and packing operation has completed, signaling to the software that it is safe to access the packed data. Any suitable semantics and/or completion signals can be used to indicate the completion event. For example, such semantics can be similar to completion signals for notifying completion of other types of variable-latency operations, such as operations performed by compute accelerators.

MC 540 issues the near-memory data-dependent gather/pack primitive to the CGP 570. CGP 570 scans the source address or addresses indicated by the primitive for a number of data items. The number of data items is indicated by the count argument of the primitive in this example. CGP 570 executes the function indicated by the primitive, and writes the gathered values to the destination address indicated by the primitive and writes the indices to the index destination address indicated by the primitive in the packed form as discussed above. On completion of the packing, CGP 570 unit notifies MC 540 of the completion. After receiving this completion notification from CGP 570, MC 540 removes any tracking for the completed primitive and notifies core 520 of its completion. If higher internal memory bandwidth is available within memory module 504, CGP 570 can utilize the higher memory bandwidth for reads and writes to memory 560 to reduce interference with off-chip traffic, such as reads and writes to memory 560 from processing unit 502.

Error correcting codes (ECC) are typically employed to ensure a desired level of reliability for data in the memory. For data gathered and packed by primitives using techniques discussed herein, ECC functionality is relaxed or omitted in some implementations. In some implementations, ECC functionality is replicated near-memory (e.g., at the CGP 570).

In an example operation that does not use the gathering and packing primitives discussed herein, a CPU or GPU (e.g., core 520) stores an ECC that is computed based on data that is to be reliability protected. When the CPU or GPU reads the data, it re-computes the ECC, and compares the recomputed ECC with the stored ECC that was computed originally. If the ECC matches, the data is considered reliable. If the numbers do not match, the data can be regenerated based on the ECC in some cases.

In various implementations, ECC protection functionality can be maintained in the context of near-memory data-dependent gather and pack operations, maintaining the ECC data reliability guarantees, or this functionality can be relaxed or omitted.

Accordingly, in some examples, the ECC mechanism is replicated on the memory module (i.e., "near-memory"). For example, the ECC mechanism may be replicated by CGP 570. In other implementations, ECC may be omitted for data operated on by a data-dependent near-memory primitive such as those discussed herein. For such implementations, a determination is made in some cases as to whether the data is resilient to errors, or that ECC is otherwise unnecessary.

In some implementations, the near-memory data dependent gathering and packing techniques discussed herein have implications for address translation. For example, primitives as discussed herein are coded by a programmer in some cases and are executed by a CGP. When the address space used by the program is virtual, address translation is used to determine physical addresses for the source and destination addresses, specified in the virtual space by the primitive, before the operations indicated by the primitive are issued to the CGP.

In some implementations, near-memory data-dependent gathering and packing primitives can be limited to not span across regions of memory that are contiguous in virtual and physical address spaces. In some implementations, this can have the advantage of keeping the number of address translations required to three per primitive. Address translations are typically maintained for contiguous chunks of memory, which can be referred to as pages. In other words, for any memory location within the page, there is a single translation. If locations to be gathered from (or to be packed to) fall within one contiguous chunk (i.e., one page), the start address can be translated and this translation can be used as a basis for subsequent accesses to the page. In the context of the example primitive discussed herein, only three translations would be required; i.e., one translation each would be needed for source address, destination address, and destination index address. In implementations where gathered data and indices are stored contiguously, only two translations would be required; i.e., one for the source addresses, and one for both the destination addresses and index destinations.

Various optimizations to the near-memory data-dependent gathering and packing discussed herein are possible. For example, in some implementations, a fast memory (e.g., a memory having lower read/write access times compared with DRAM), such as a static random access memory (SRAM), can be added to the memory module (e.g., on a base die of the memory module) for the CGP unit to store packed data therein. In this case, the processing core can access the packed data from the fast SRAM instead of accessing it from memory. In some cases this also has the advantage of reducing pressure on memory bandwidth, as a write of the gathered and packed data to the main memory and a subsequent read of that data from main memory are avoided.

In another possible optimization, circuitry to carry out the pre-defined functions for determining which values to gather (e.g., non-zero, positive, negative, threshold, and so forth as discussed earlier) are placed close to memory arrays and within the memory die to filter read data based on desired function and to transmit only gathered data from the memory dies to the CGP unit in the logic die. In this context, in various implementations, placing this circuitry close to memory arrays entails placing the circuitry at any of the hierarchical levels of the memory modules, such as near, connected to, or adjacent to a particular memory array; near, connected to, or adjacent to bank input/output circuitry shared by arrays in a memory bank; or the like. In some cases this has the advantage of saving memory bandwidth, potentially at an area cost of adding such circuitry (e.g., data-dependent reading, gathering, writing, and/or packing circuitry) in the memory dies. Such units, for example, can be placed at the output of memory arrays or in the row buffers of DRAM (or other row-oriented memory organizations) and can be used to perform the filtering (e.g., function and threshold) in a parallel manner to provide greater performance enhancements.

Although the present teachings are described with the CGP unit in the memory module (e.g., CGP 570 on memory module 504), it is also possible to implement the CGP at or near the memory controller (e.g., MC 540 on processing unit 502). Implementing the CGP on the CPU or GPU does not permit exploitation of in-memory bandwidth (where available), but in some cases will provide the benefit of not polluting caches as discussed herein. For example, in some implementations, if the gather operation were performed from the core 520, all data at the source location will be read by core 520 causing it to be cached in cache 530. Because of the data sparsity of the source, only some of the data items are useful, and the other items (e.g., not subject to the gather operation) would pollute cache 530 (i.e., would cache information unlikely to be needed in the near term). If CGP 570 were implemented on MC 540 or otherwise on processing unit 502, and CGP 570 were to issue the gather operation, it would avoid such cache pollution.

Various examples herein refer to implementation of a CGP and other components on the base die of a stacked memory, such as HBM or HMC. It is noted however that the techniques, devices, and systems discussed herein are applicable to any memory that can accommodate near-memory computing. Such memory includes other forms of emerging memories, such as non-volatile memory modules (e.g., NVDIMM-P), as well as traditional forms of memory such as SRAM scratchpad memories, DDR DRAM and the like.

Figure 6:
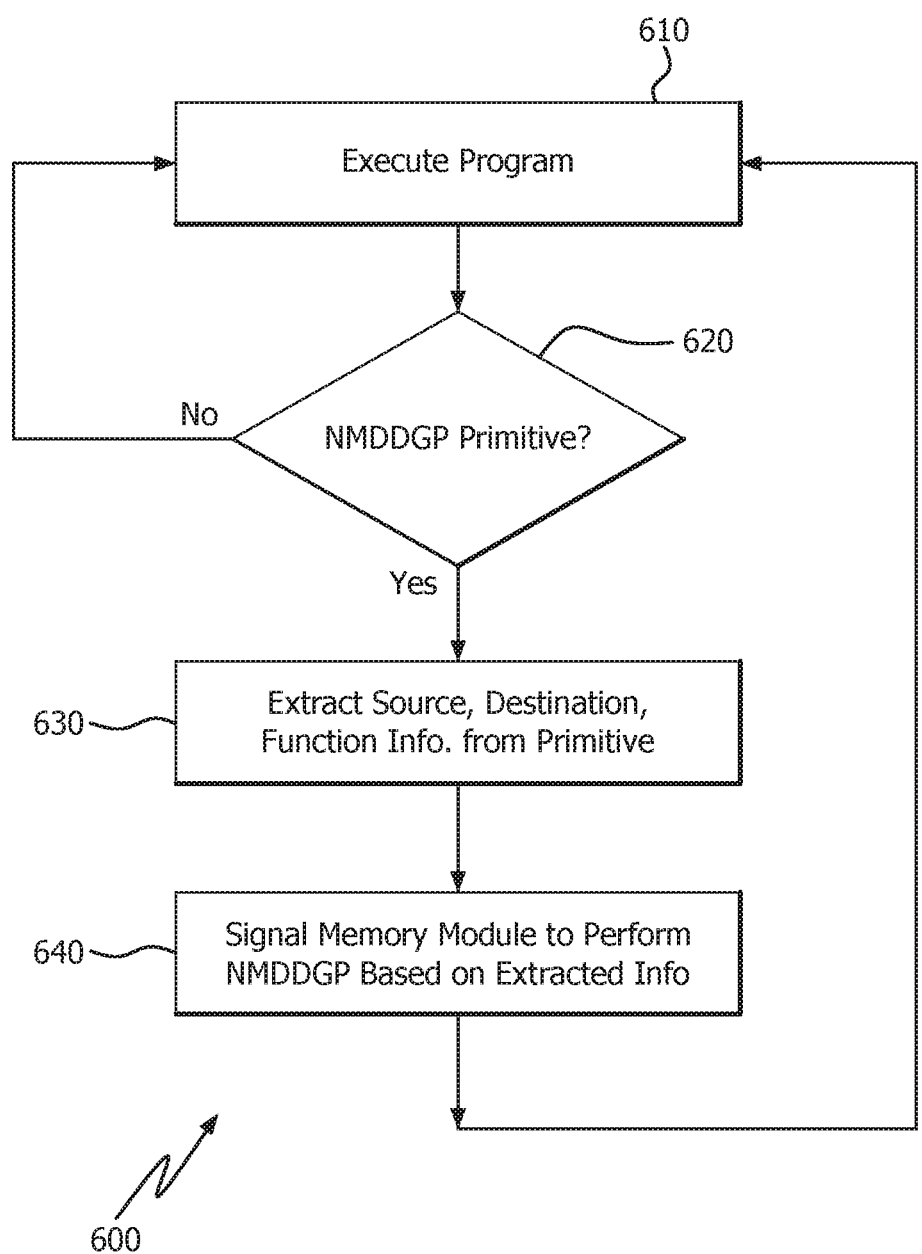
FIG. 6 is a flow chart illustrating an example procedure for a processor to initiate a near-memory data-dependent gathering and packing operation.

FIG. 6 is a flow chart illustrating an example procedure 600 for a processor (e.g., processing unit 502 as shown and described with respect to FIG. 5) to initiate a near-memory data-dependent gathering and packing operation. It is noted that steps may be modified, added to, removed from, or reordered within, procedure 600 consistent with the various implementations discussed herein.

In step 610, the processing unit executes a program. On a condition 620 that the processing unit encounters and executes a near-memory data-dependent gathering and packing (NMDDGP in the figures) primitive (e.g., gather_and_pack_type_type or the like as discussed herein), the processing unit extracts arguments from the primitive in step 630. Examples of the extracted arguments from the primitive include any one or a combination of the following: a function; a source address; a destination address; an index destination address; and count arguments. As discussed herein, a greater or lesser number of arguments and/or different arguments may be used in various implementations. In step 640, the processing unit signals a memory module having near-memory processing capability (e.g., CGP 570 as shown and described with respect to FIG. 5) to perform near-memory data-dependent gathering and packing. The processing unit then continues executing the program in step 610 (possibly stalling execution or otherwise based on a completion handle as further described herein).

Figure 7:
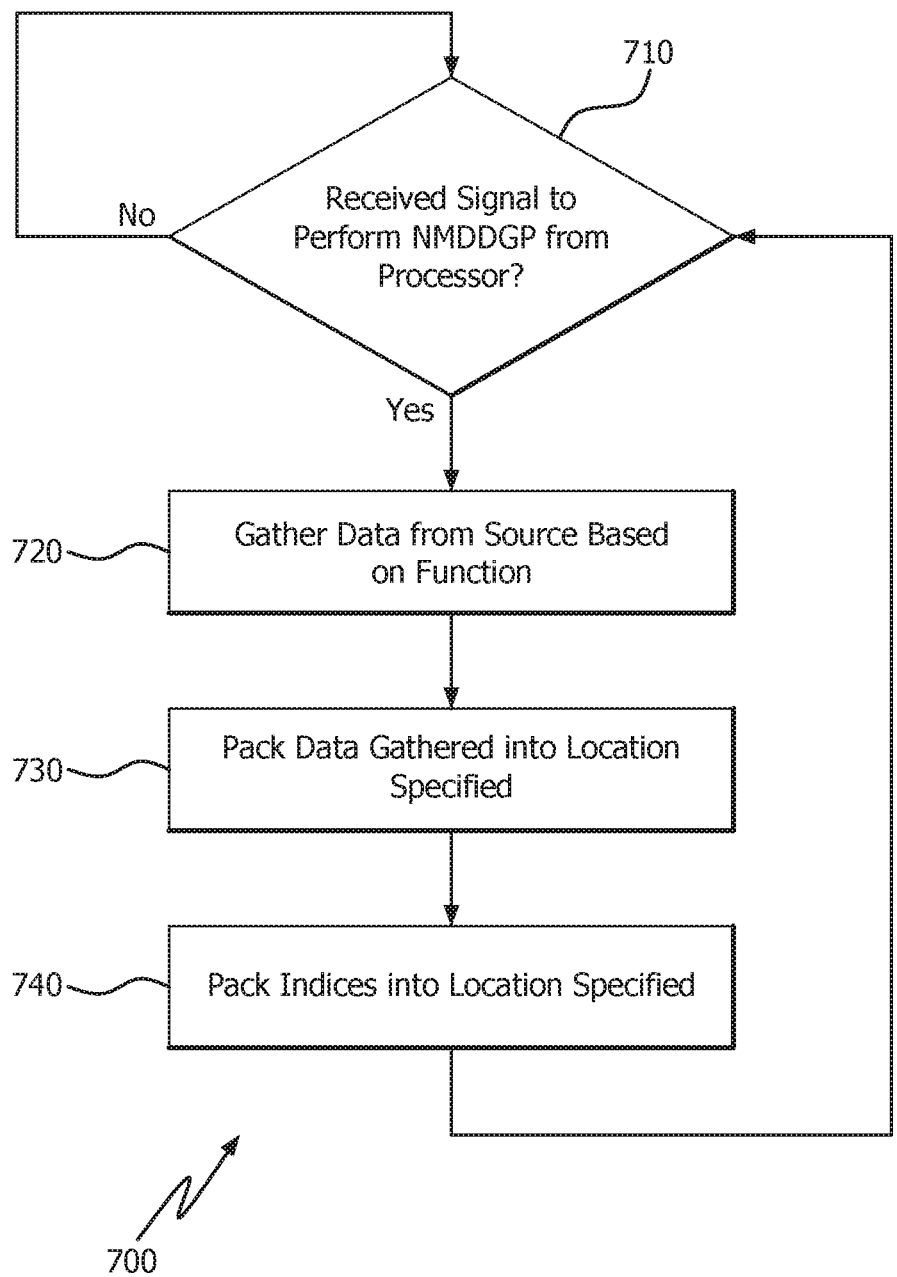
FIG. 7 is a flow chart illustrating an example procedure for a memory module to perform a near-memory data-dependent gathering and packing operation.

FIG. 7 is a flow chart illustrating an example procedure 700 for a memory module (e.g., memory module 504 as shown and described with respect to FIG. 5) to perform a near-memory data-dependent gathering and packing operation. It is noted that steps may be modified, added to, removed from, or reordered within, procedure 700 consistent with the various implementations discussed herein.

On a condition 710 that the memory module receives a signal to perform a near-memory data-dependent gathering and packing operation from a processing unit (e.g., processing unit 502 as shown and described with respect to FIG. 5), the memory module performs the operation based on the parameters provided by the processing unit (e.g., as derived from arguments of a gather_and_pack_type_type or the like as discussed herein). In this example, a near-memory processing device (e.g., CGP 570 as shown and described with respect to FIG. 5) of the memory module gathers data from a source location in memory based on function and source address information received from the processing unit in step 720, packs data gathered into a memory location specified in the information received from the processing unit in step 730, and packs indices of the gathered data into a memory location specified by the processing unit in step 740. After execution, the flow returns to step 710 until another near-memory data-dependent gathering and packing operation signal is received from the processing unit.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for near-memory data-dependent gathering and packing of data stored in a memory, the method comprising:
    extracting, by a processing device, a function, a memory source address, and a memory destination address, from a near-memory data-dependent gathering and packing primitive;
    sending a signal to perform gathering and packing operations based on the primitive to near-memory processing circuitry of a memory device;
    receiving, by the near-memory processing circuitry, the signal;
    gathering, by the near-memory processing circuitry, data from the memory device based on the function and the memory source address;
    packing, by the near-memory processing circuitry, the gathered data into the memory device based on the memory destination address;
    gathering, by the near memory processing circuitry, indices of the data; and
    packing, by the near-memory processing circuitry, the gathered indices into the memory device based on the memory destination.

2. The method of claim 1, wherein the gathered indices are packed into entries of the memory device that are consecutive with entries of the memory device into which the gathered data is packed.

3. The method of claim 1, further comprising:
    extracting a second memory destination address from the primitive;
    gathering, by the near-memory processing circuitry, indices of the data; and
    packing, by the near-memory processing circuitry, the gathered indices into the memory device based on the second memory destination address.

4. The method of claim 1, wherein the function comprises determining whether the data from the memory device includes a non-zero value, a positive value, a negative value, a value exceeding a threshold, or a value not exceeding a threshold.

5. The method of claim 1, wherein the memory device comprises a stacked memory device, and wherein the near-memory processing circuitry is disposed on a die of the stacked memory device.

6. The method of claim 1, further comprising replicating, by the near-memory processing circuitry, error correcting code (ECC) functionality of the processing device.

7. The method of claim 1, further comprising flushing a cache of the processing device prior to the gathering of the data from the memory device.

8. A computing device configured for near-memory data-dependent gathering and packing of data, the computing device comprising:
    a processing device which includes processing circuitry; and
    a memory device which includes near-memory processing circuitry;
    the processing circuitry configured to:
        extract a function, a memory source address, and a memory destination address, from a near-memory data-dependent gathering and packing primitive; and
        send a signal to perform gathering and packing operations based on the primitive to near-memory processing circuitry of the memory device;
    the near-memory processing circuitry configured to:
        receive the signal;
        gather data from the memory device based on the function and the memory source address;
        pack the gathered data, into the memory device based on the memory destination address;
        gather indices of the data; and
        pack the gathered indices into the memory device based on the memory destination address.

9. The computing device of claim 8, wherein the processing circuitry is further configured to pack gathered indices into entries of the memory device that are consecutive with entries of the memory device into which the gathered data is packed.

10. The computing device of claim 8, wherein the processing circuitry is further configured to:
    extract a second memory destination address from the primitive;
    gather indices of the data; and
    pack the gathered indices into the memory device based on the second memory destination address.

11. The computing device of claim 8, wherein the function comprises determining whether the data from the memory device includes a non-zero value, a positive value, a negative value, a value exceeding a threshold, or a value not exceeding a threshold.

12. The computing device of claim 8, wherein the memory device comprises a stacked memory device, and wherein the near-memory processing circuitry is disposed on a die of the stacked memory device.

13. The computing device of claim 8, wherein the processing circuitry s further configured to replicate error correcting code (ECC) functionality of the processing device.

14. The computing device of claim 8, wherein the processing circuitry is further configured to flush a cache of the processing device prior to gathering the data from the memory device.

15. A processing device configured for near-memory data-dependent gathering and packing of data, the processing device comprising:
circuitry configured to extract a function, a memory source address, and a memory destination address from a near-memory data-dependent gathering and packing primitive;
circuitry configured to send a signal to perform gathering and packing operations based on the primitive to near-memory processing circuitry of a memory device;
wherein the gathering and packing operations comprise:
gathering, by the near-memory processing circuitry, data from the memory device based on the function and the memory source address;
packing, by the near-memory processing circuitry, the gathered data, into the memory device based on the memory destination address;
gathering, by the near-memory processing circuitry, indices of the data; and
packing, by the near-memory processing circuitry, the gathered indices into the memory device based on the memory destination address.

16. The processing device of claim 15, wherein the gathering and packing operations further comprise:
packing the gathered indices packed into entries of the memory device that are consecutive with entries of the memory device into which the gathered data is packed.

17. The processing device of claim 15, further comprising:
circuitry configured to extract a second memory destination address from the primitive;
wherein the gathering and packing operations further comprise:
gathering, by the near-memory processing circuitry, indices of the data; and
packing, by the near-memory processing circuitry, the gathered indices into the memory device based on the second memory destination address.

18. The processing device of claim 15, wherein the function comprises determining whether the data from the memory device includes a non-zero value, a positive value, a negative value, a value exceeding a threshold, or a value not exceeding a threshold.

19. The processing device of claim 15, wherein the memory device comprises a stacked memory device, and wherein the near-memory processing circuitry is disposed on a die of the stacked memory device.

20. The processing device of claim 15, further comprising circuitry configured to replicate error correcting code (ECC) functionality of the processing device.

21. The processing device of claim 15, further comprising circuitry configured to flush a cache of the processing device prior to gathering the data from the memory device.

22. A configurable gather-packer device disposed on a memory device and configured for near-memory data-dependent gathering and packing of data stored in the memory device, comprising:
circuitry configured to receive, from a processing device, a signal to perform gathering and packing operations based on a function, a memory source address, and a memory destination address;
circuitry configured to gather data from the memory device based on the function and the memory source address;
circuitry configured to pack the gathered data into the memory device based on the memory destination address;
circuitry configured to gather indices of the data; and
circuitry configured to pack the gathered indices into the memory device, based on the memory destination address.

23. The configurable gather-packer device of claim 21, further comprising:
circuitry configured to pack the gathered indices into entries of the memory device that are consecutive with entries of the memory device into which the gathered data is packed.

24. The configurable gather-packer device of claim 22, further comprising:
circuitry configured to gather indices of the data; and
circuitry configured to pack the gathered indices into the memory device based on a second memory destination address received in the signal.

25. The configurable gather-packer device of claim 22, wherein the function comprises determining whether the data from the memory device includes a non-zero value, a positive value, a negative value, a value exceeding a threshold, or a value not exceeding a threshold.

26. The configurable gather-packer device of claim 22, wherein the memory device comprises a stacked memory device, and wherein the configurable gather-packer device is disposed on a die of the stacked memory device.

27. The configurable gather-packer device of claim 22, further comprising circuitry configured to replicate error correcting code (ECC) functionality of the processing device.

28. The configurable gather-packer device of claim 22, further comprising circuitry configured to flush a cache of the processing device is prior to gathering data from the memory device.

29. A method for data-dependent gathering and packing of data stored in a memory device, the method comprising:
extracting, by a core of a processing device, a function, a memory source address, and a memory destination address, from a near-memory data-dependent gathering and packing primitive;
sending a signal to perform gathering and packing operations based on the primitive to a configurable gather-packer device of the processing device;
receiving, by the configurable gather-packer device, the signal;
gathering, by the configurable gather-packer device, data from the memory device based on the function and the memory source address;
packing, by the configurable gather-packer device, the gathered data, into the memory device based on the memory destination address;
gathering, by the configurable gather-packer device, indices of the data; and
packing, by the configurable gather-packer device, the gathered indices into the memory device based on the memory destination address;
wherein operations carried out by the configurable gather-packer device are not cached on the processing device.

30. The method of claim 29, wherein the gathered indices are packed into entries of the memory device that are consecutive with entries of the memory device into which the gathered data is packed.

31. The method of claim 29, further comprising:
extracting a second memory destination address from the primitive;
gathering, by the configurable gather-packer device, indices of the data; and
packing, by the configurable gather-packer device, the gathered indices, into the memory device, based on the second memory destination address.

32. The method of claim 29, wherein the function comprises determining whether the data from the memory device includes a non-zero value, a positive value, a negative value, a value exceeding a threshold, or a value not exceeding a threshold.

33. The method of claim 29, wherein the memory device comprises a stacked memory device.

34. The method of claim 29, further comprising replicating, by the configurable gather-packer device, error correcting code (ECC) functionality of the processing device.

35. The method of claim 29, further comprising flushing a cache of the processing device prior to the gathering of the data from the memory device.

36. A computing device configured for near-memory data-dependent gathering and packing of data, the computing device comprising:
a processing device which includes processing circuitry and a configurable gather-packer device; and a memory;
the processing circuitry configured to extract a function, a memory source address, and a memory destination address, from a near-memory data-dependent gathering and packing primitive;
the processing circuitry further configured to send a signal to perform gathering and packing operations based on the primitive to the configurable gather-packer device;
the configurable gather-packer device configured to receive the signal;
the configurable gather-packer device further configured to gather data from the memory device based on the function and the memory source address;
the configurable gather-packer device further configured to pack the gathered data into the memory device based on the memory destination address;
the configurable gather-packer device further configured to gather indices of the data; and
the configurable gather-packer device further configured to pack the gathered indices into the memory device based on the memory destination address;
wherein operations carried out by the configurable gather-packer device are not cached on the processing device.

37. The computing device of claim 36, wherein the circuitry of the configurable gather-packer device is configured to pack the gathered indices into entries of the memory device that are consecutive with entries of the memory device into which the gathered data is packed.

38. The computing device of claim 36, wherein the processing circuitry is further configured to extract a second memory destination address from the primitive, and the configurable gather-packer device is further configured to gather indices of the data and pack the gathered indices into the memory device based on the second memory destination address.

39. The computing device of claim 36, wherein the function comprises determining whether the data from the memory device includes a non-zero value, a positive value, a negative value, a value exceeding a threshold, or a value not exceeding a threshold.

40. The computing device of claim 36, wherein the memory device comprises a stacked memory device.

41. The computing device of claim 36, wherein the configurable gather-packer device further comprises circuitry configured to replicate error correcting code (ECC) functionality of the processing device.

42. The computing device of claim 36, further comprising circuitry configured to flush a cache of the processing device prior to gathering the data from the memory device.

* * * * *